(12) United States Patent
Chemparathy et al.

(10) Patent No.: US 10,672,098 B1
(45) Date of Patent: Jun. 2, 2020

(54) SYNCHRONIZING ACCESS TO BUFFERED DATA IN A SHARED BUFFER

(71) Applicant: Xilinx, Inc., San Jose, CA (US)

(72) Inventors: Cyril Chemparathy, Campbell, CA (US); Mrinal J. Sarmah, San Jose, CA (US); Hyun W. Kwon, San Jose, CA (US); Maurice Penners, Boulder Creek, CA (US)

(73) Assignee: XILINX, INC., San Jose, CA (US)

( * ) Notice: Subject to any disclaimer, the term of this patent is extended or adjusted under 35 U.S.C. 154(b) by 2 days.

(21) Appl. No.: 15/946,300

(22) Filed: Apr. 5, 2018

(51) Int. Cl.
*G06T 1/60* (2006.01)

(52) U.S. Cl.
CPC ........................................ *G06T 1/60* (2013.01)

(58) Field of Classification Search
CPC ............................................................ G06T 1/60
USPC .......................................................... 345/545
See application file for complete search history.

(56) References Cited

U.S. PATENT DOCUMENTS

| | | | | |
|---|---|---|---|---|
| 6,470,033 | B1* | 10/2002 | Menzi | H04J 3/073 370/505 |
| 7,590,764 | B2* | 9/2009 | Rooney | G06F 13/4059 710/19 |
| 8,069,385 | B1* | 11/2011 | Chopra | G11C 29/16 714/723 |
| 2004/0054823 | A1* | 3/2004 | Rooney | G06F 13/4059 710/33 |
| 2005/0162957 | A1* | 7/2005 | Oh | G11C 11/406 365/222 |
| 2006/0044165 | A1* | 3/2006 | Takakura | H03M 7/40 341/63 |
| 2008/0123740 | A1* | 5/2008 | Ye | H04N 5/21 375/240.11 |
| 2008/0191733 | A1* | 8/2008 | Redgrave | H03K 19/17736 326/9 |
| 2009/0024787 | A1* | 1/2009 | Yim | G06F 12/0246 711/103 |
| 2009/0141188 | A1* | 6/2009 | Shirai | H04N 9/3105 348/743 |
| 2014/0192881 | A1* | 7/2014 | Xu | H04N 19/52 375/240.16 |

(Continued)

OTHER PUBLICATIONS

Fleming, Kermin et al., "H.264 Decoder: A Case Study in Multiple Design Points," Proc. of the Sixth ACM/IEEE International Conference on Formal Methods and Models for Co-Design, Jun. 1, 2008, pp. 165-174, IEEE Computer Society, Washington, DC, USA.

(Continued)

*Primary Examiner* — Ke Xiao
*Assistant Examiner* — Kim Thanh T Tran
(74) *Attorney, Agent, or Firm* — Patterson + Sheridan, LLP

(57) ABSTRACT

Systems and method for synchronizing access to buffered data are disclosed. In such a method, video data is buffered in a frame buffer memory by a producer device. A write level indicator is provided to a synchronizer by the producer device. A read level indicator is provided to the synchronizer by a consumer device. The synchronizer compares the write level indicator with the read level indicator to determine a difference. The consumer device is informed by the synchronizer when the difference meets a sub-frame threshold. The consumer device reads the buffered data from the frame buffer memory on a sub-frame-by-sub-frame basis responsive to the informing.

20 Claims, 10 Drawing Sheets

(56) References Cited

U.S. PATENT DOCUMENTS

| | | | | |
|---|---|---|---|---|
| 2014/0240549 A1* | 8/2014 | Seshadrinathan | .... | H04N 5/2353 |
| | | | | 348/239 |
| 2015/0003513 A1* | 1/2015 | Hashimoto | .......... | H04N 19/117 |
| | | | | 375/240.02 |
| 2016/0028985 A1* | 1/2016 | Vogelsang | ........ | H01L 27/14641 |
| | | | | 348/294 |
| 2017/0330599 A1* | 11/2017 | Liu | ........................ | G11B 27/10 |

OTHER PUBLICATIONS

Wang, Yao, "Video Coding Basics," Class EE4414—Multimedia Communication Systems II, copyright 2003, pp. 1-37, Polytechnic University, Department of Electrical and Computer Engineering, Brooklyn, New York, USA.

* cited by examiner

SYNCHRONIZING ACCESS TO BUFFERED DATA IN A SHARED BUFFER

TECHNICAL FIELD

The following description relates to integrated circuit devices ("ICs"). More particularly, the following description relates to a synchronizing access to buffered data in a shared buffer for an IC.

BACKGROUND

A video encoder-decoder ("codec") may be an electronic circuit, a software application, or a combination of both. On the encoder side, a codec compresses a digital video input. On the decoder side, a codec decompresses compressed digital video content. Codecs may be used in augmented reality ("AR") and virtual reality ("VR") applications, among other video processing applications. A limitation of codecs is latency, which can cause significant lag in AR and VR applications, among other applications.

SUMMARY

A method relates generally to synchronizing access to buffered data. In such a method, video data is buffered in a frame buffer memory by a producer device. A write level indicator is provided to a synchronizer by the producer device. A read level indicator is provided to the synchronizer by a consumer device. The synchronizer compares the write level indicator with the read level indicator to determine a difference. The consumer device is informed by the synchronizer when the difference meets a sub-frame threshold. The consumer device reads the buffered data from the frame buffer memory on a sub-frame-by-sub-frame basis responsive to the informing.

A system relates generally to synchronizing access to share a frame buffer memory. In such a system, there is a synchronizer. A producer device is configured to buffer video data in the frame buffer memory and to provide a write level indicator to the synchronizer. A consumer device is configured to provide a read level indicator to the synchronizer. The synchronizer is configured to compare the write level indicator with the read level indicator to determine a difference and to inform the consumer device as to the difference meeting a sub-frame threshold. The consumer device is configured to read the buffered data from the frame buffer memory on a sub-frame-by-sub-frame basis responsive to the difference.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

Figure 1:
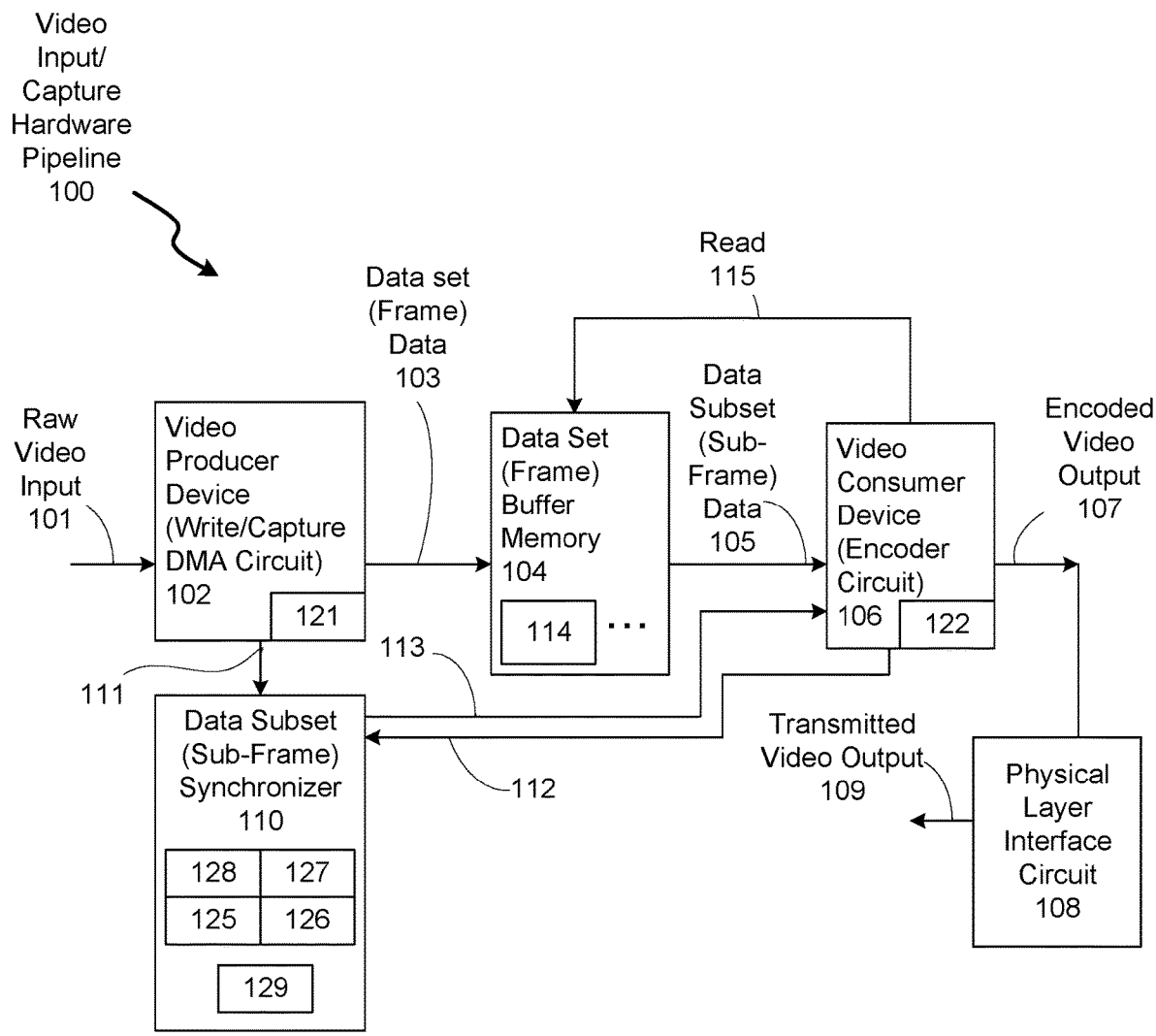
FIG. 1 is a block diagram depicting an exemplary video input/capture pipeline.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Before describing the examples illustratively depicted in the several figures, a general introduction is provided to further understanding.

In a video application with a codec implemented at least in part in hardware, an input stage of such hardware codec portion may include a video capture pipeline. Such a video capture pipeline has a physical layer protocol and a link layer protocol to interface to a video capture device or other video producer device. Examples of physical layer protocols for video include DisplayPort and HDMI (High-Definition Multimedia Interface), among others.

Output of a link layer protocol is provided as input to a frame capture device. Examples of a link layer protocol include Ethernet, IEEE 802, and PPP (Point-to-Point Protocol). An example of a frame capture device is a write Direct Memory Access (DMA) device, such as a video camera. However, a video file in a computer may be a "frame capture device." Generally, a video producer or source may be considered any of a variety of video capture devices. A video producer may input raw video data into memory, including without limitation video memory. Such memory may be segmented into frame buffers, where each frame buffer is for a frame of video.

Raw video frames in video memory may be retrieved and encoded by a video encoder configured to compress such raw video stream, namely a sequence of raw video frames. Along those lines, a video encoder may generally be considered a video consumer or video sink. Such compression may include elimination of redundancy in raw video frames and motion compensation. Examples of video coding formats include H.264, H.265, HEVC, VP8 or VP9, among others.

After compression, encoded video data may be transmitted, such as over an Ethernet interface or other physical layer interface. Additionally, encoded video data, which may be combined with encoded audio data, may be put into a transmission container bitstream for streaming, such as over a network. For purposes of clarity by way of example and not limitation, the following description is in terms of video data, though other types of data that are delivered in a data set, such as a frame or other data set, may benefit from the technology described herein.

There are protocols to support point-to-point video transmission and network video transmission. Protocols that support point-to-point transmission of uncompressed or raw video data include DisplayPort and HDMI (High-Definition Multimedia Interface). For streaming over a network, datagram protocols, such as the User Datagram Protocol (UDP), send an encoded media or video stream as a series of small packets. Other protocols that support streaming encoded media or video over networks include Real-time Streaming Protocol (RTSP), Real-time Transport Protocol (RTP), and Real-time Transport Control Protocol (RTCP).

In a video application with a codec implemented at least in part in hardware, an output stage of such hardware codec portion may include a video output pipeline. In a video output pipeline, received compressed frames, such as for example transmitted over a network, may be decompressed by a video decoder. Decompressed video data output from a decoder may be written into memory, including without limitation video memory. A display device, such as having an HDMI or DisplayPort transmitter interface for example, may read decompressed or decoded video data from memory. Such memory may be segmented into picture buffers, where each picture buffer is for a raw video frame. Such display device sends such read raw video frames from picture buffers to a display controller. A display controller encapsulates such raw video frames into a link layer and a physical layer specification, and then sends such encapsulated video frames for display, such as on a screen of a display device or other form of display.

However, as mentioned above, lag due to operation of a video pipeline on a frame-by-frame basis may cause significant lag in AR or VR video for example. A video pipeline may have multiple stages, and delay for each stage can add up. For example, a frame delay may be added if a video pipeline stage accesses a frame from memory. For inline processing, such frame delay may be a fraction of a frame. For example, for a 60 Hz frame rate, there may be a 16.667 millisecond latency or delay per frame. If there are five or more video pipeline stages, latency may be a multiple of five or more of such a 16.667 millisecond delay. Of course, other frame rates may be used. This amount of delay can cause AR or VR video to appear "laggy" due to such latency.

As described below in additional detail, to reduce latency in display of video, a synchronizer is added to a data set-by-data set pipeline, such as a frame-by-frame pipeline, to convert such pipeline to a subset-by-subset pipeline, such as a sub-frame-by-sub-frame pipeline. By not waiting for an entire data set to buffer, such as an entire frame to buffer, latency may be reduced by performing operations at a subset-level, such as a sub-frame level. For purposes of clarity by way of example and not limitation, it shall be assumed that a data set is a video frame of data. However, in other examples, a data set may be a set of data other than a video frame of data.

In a video processing pipeline, conventionally there is a software stack. As described below in additional detail, a software stack may be used with limited change in operation of same. Along those lines, such a software stack operates on a frame-by-frame basis. However, hardware in communication with such software stack operates on a sub-frame-by-sub-frame basis.

With the above general understanding borne in mind, various configurations for a sub-frame-by-sub-frame pipeline are generally described below.

FIG. 1 is a block diagram depicting an exemplary video input/capture hardware pipeline system ("video input/capture pipeline") 100. Video input/capture hardware pipeline 100 may be for obtaining raw video input information ("raw video input") 101 from a file, a camera, or other source of raw video input 101. Video input/capture hardware pipeline 100 includes a video producer device 102, a data set buffer memory 104, a video consumer device 106, and a data subset synchronizer circuit 110. Again, for purposes of clarity by way of non-limiting example, data subset synchronizer circuit ("synchronizer") 110 is a sub-frame synchronizer 110, and a data set buffer memory 104 is a frame buffer memory 104. A video producer device 102 may include a digital video receiver interface 121 for receiving raw video input data 101, and a video consumer device 106 may include a digital video transmitter interface 122 for outputting processed video output, such as encoded video output 107 for example.

Additionally, for purposes of clarity by way of non-limiting example, video producer device 102 in this example is a write/capture DMA circuit 102, and video consumer device 106 is an encoder circuit 106. However, in other examples, other types of video producer and/or consumer devices may be used.

Write/capture DMA circuit ("DMA circuit") 102, frame buffer memory 104, encoder circuit 106, and synchronizer 110 are all implemented in hardware. Implementation in hardware may be in application specific circuitry and/or programmable resources, the latter of which may be of an FPGA or other integrated circuit with programmably configurable logic.

Furthermore, video input/capture hardware pipeline 100 may include a physical link interface circuit 108. As physical link interface circuits are well-known, physical link interface circuit 108 is not described in unnecessary detail.

Raw video input 101 captured by DMA circuit 102 may be written to frame buffer memory 104 by DMA circuit 102. DMA circuit 102 may provide a write level indicator ("write indicator") signal 111 to synchronizer 110. Write indicator signal 111 may provide an indication of how much of raw video input 101 data has been written to a frame buffer 114 of frame buffer memory 104. Again, frame buffer memory 104 may be a contiguous memory for a video frame buffer memory though segmented with a plurality of frame buffers 114. Conventionally, each frame buffer 114 has memory space for one frame. However, in some implementations, a frame buffer 114 may have a memory space greater than one frame. For purposes of clarity by way of non-limiting example, it shall be assumed that frame buffer 114 is for only one frame of video data.

DMA circuit 102 writes a data set, which in this example is a frame of data, not all at once but over time by providing frame data 103 to a frame buffer 114. Write indicator signal 111 may thus be periodically updated as provided from DMA circuit 102 to synchronizer 110. Effectively, write indicator signal 111 is a frame buffer 114 fill level signal. Along those lines, write indicator signal 111 may be an end of a current write row address. Such an end of current write row address which may indicate how many rows of a frame have been written to frame buffer 114.

Conventionally, a video frame is composed of an array of pixels. Tiling of a video frame may be performed using a sub-set or sub-frame of such an array. Examples of tiles are 8×8 pixels and 64×64 pixels; however, these or other tile sizes may be used. As a row and a column of a video frame are longer and deeper than a tile, multiple tiles may be used to tile a video frame, where each tile has less than an entire row and less than an entire column of a video frame. Additionally, conventional streaming of a video frame may be performed using entire rows of a video frame at a time.

Whether a sub-frame is a tile for tiling a frame or multiples of entire rows for streaming, write indicator signal 111 may be used to indicate to synchronizer 110 whether a sub-frame amount, tile or rows, of video frame data 103 has been written to a frame buffer 114. A read amount or level indicator ("read level indicator") signal 112 may be provided from encoder circuit 106 to synchronizer 110. Read level indicator signal 112 may indicate a sub-frame increment encoder device 106 is to consume for an encoding thereof. Continuing the above example, read level indicator signal 112 may indicate a write has proceeded in a frame buffer to at least a sub-frame increment in such frame buffer for encoder device 106 to read a sub-frame increment from such frame buffer 114. Along those lines, read level indicator signal 112 may be a read address for encoder device 106 indicating a sub-frame increment.

As a frame buffer 114 is progressively filled with frame data 103, such read address of read level indicator signal 112 is passed, and so such read address of read level indicator signal 112 may be progressively incremented, with a last increment being for an end of frame buffer 114 address for example. Synchronizer 110 may be configured to compare status of a current write level address provided via write indicator signal 111 with status of a current read level address provided with read level indicator signal 112 to determine whether such write level address is equal to or greater than such current read level address. This comparison of write level and read level addresses may be used to provide a data valid signal 113 from synchronizer 110 to encoder circuit 106. Assertion of data valid signal 113 by synchronizer 110 informs encoder circuit 106 to read a sub-frame from frame buffer 114 and increment read level indicator signal 112 by another sub-frame amount, which increment may be in the form of an increase in a read address level.

In response to assertion of data valid signal 113, encoder circuit 106 may be configured to assert a read signal 115 to frame buffer memory 104 to read a sub-frame of video data from a frame buffer 114. Frame buffer memory 104 may read out data from a sub-frame, which read data may be provided via data signal 105 to encoder circuit 106.

Encoder circuit 106 may increment read level indicator signal 112 and encode such sub-frame of data obtained via sub-frame data signal 105 responsive to read signal 115. Read signal 115 may indicate an address range for reading such a sub-frame of data from a frame buffer.

After encoding a sub-frame of data, encoder circuit 106 may output encoded video output 107. Encoded video output 107 may be an encoded sub-frame of video data, which may be provided to physical link interface circuit 108 for transmission as video output 109.

As each sub-frame of video data is output from video input/capture hardware pipeline 100, a display device may display such video data with less latency than having waited for an entire frame of video data to be buffered in a frame buffer before being read therefrom for encoding by an encoder. Along those lines, piping video sub-frames into and out of frame buffer memory 114 may be used to reduce system latency.

Additionally, DMA circuit 102 provides write indicator signal 111 and address updates thereto. Frame buffer memory does not have to be changed from a conventional instance thereof. Encoder circuit 106 may be configured to provide a read level indicator signal 112, receive a data valid signal 113, and update a read level indicator signal 112. However, sub-frame processing by encoder circuit 106 does not involve any changes to conventional encoding operations, other than encoding on a sub-frame-by-sub-frame basis.

While overall latency may still depend upon encoding a last sub-frame in a frame buffer, by providing encoded sub-frames the effect of latency, namely "lagginess", in video applications, such as AR and VR for example, may be reduced by piping out sub-frames. In other words, latency to getting to a first sub-frame, to a second sub-frame, and so on to a next to last sub-frame of a frame of video information is reduced even though latency to getting to a last sub-frame of such a frame of video information is the same.

Figure 2:
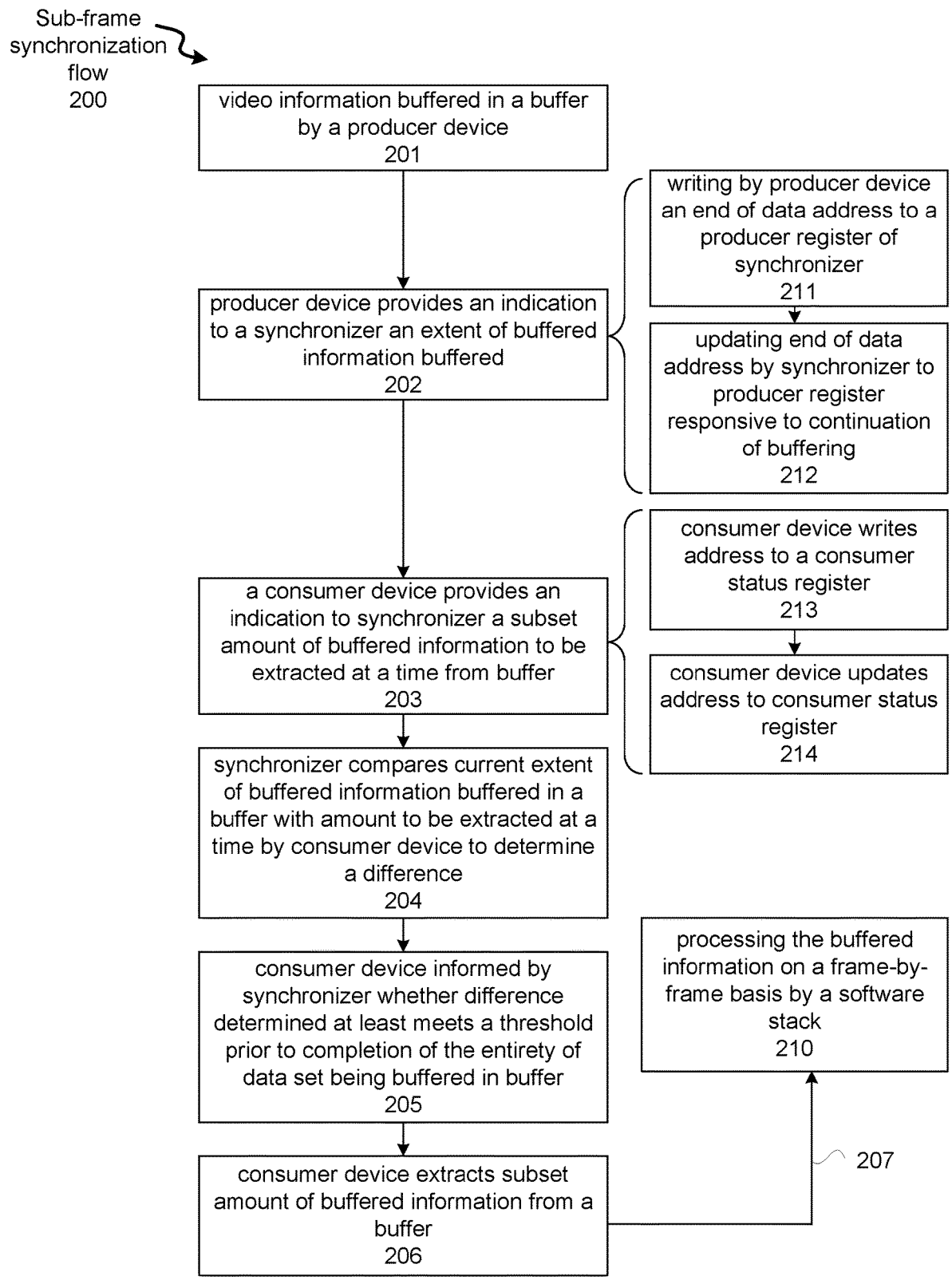
FIG. 2 is a flow diagram depicting an exemplary sub-frame synchronization flow.

FIG. 2 is a flow diagram depicting an exemplary sub-frame synchronization flow 200. Sub-frame synchronization flow 200 may be used for synchronizing access to buffered information using a video pipeline, such as a video capture hardware pipeline 100 of FIG. 1. Accordingly, sub-frame synchronization flow 200 is further described with simultaneous reference to FIGS. 1 and 2.

At 201, video information may be buffered in a buffer, such as a frame buffer 114 of frame buffer memory 104, by a producer device, such as a DMA circuit 102 DMA writing to frame buffer memory 104, to provide buffered information. At 202, a producer device, such as DMA circuit 102, provides an indication, such a current write indicator signal 111, to synchronizer 110 of the extent or current fill level of buffered information buffered by such producer device 102 in such buffer, such as a frame buffer 114.

At 203, a consumer device, such as an encoder circuit 106, provides an indication, such as read level indicator signal 112, indicating to synchronizer 110 an amount of video buffered information to be extracted or otherwise read for a read cycle from a buffer, such as a frame buffer 114, by a consumer device, such as an encoder circuit 106. Such amount to be extracted over a period of time for a read cycle is a subset amount, such as a sub-frame, being a subset of a data set, such as a sub-frame of a frame of video data, to be buffered in a buffer, such as a frame buffer 114.

Synchronizer 110 may be configured for sub-frame level buffer synchronization for a tile of a plurality of tiles defining a frame of video data, where such tile has at least x rows and at least y columns for x and y positive integers greater than 1. However, in another example, synchronizer 110 may be configured for sub-frame level buffer synchronization for at least one entire row of a plurality of rows defining a frame of video data for streaming by a consumer device, such as for example an encoder circuit 106, including without limitation streaming downstream of such consumer device responsive to output from such consumer device. Even though only a single consumer device is described, more than one consumer device may share a buffer with a producer device, and such a producer device may provide video data for one or more downstream consumer devices.

At 204, synchronizer 110 may compare the current extent of buffered video information or data buffered in a frame buffer 114 with the subset amount to be extracted at a time for a read cycle by a consumer device, such as encoder circuit 106, to determine a difference. At 205, such a consumer device, such as encoder circuit 106, may be informed by synchronizer 110 whether the difference determined at 204 at least meets a threshold prior to completion of the entirety of a data set, such as a video frame, being buffered in a frame buffer 114.

At 206, a consumer device, such as encoder circuit 106, may extract or read such a sub-frame amount of buffered information from a frame buffer 114 responsive to such informing at 205 and encode, or decode as applicable, such extracted or read sub-frame amount of video data. The entirety of a data set in this example may be the entirety of a frame of video data.

Indicating at 202 by a video producer device 102, namely a video source, to a synchronizer 110 a current extent of buffered information buffered in a frame buffer 114 may include operations at 211 and 212. At operation 211, producer device 102 writes a current end of data address to a producer status register 127 of synchronizer 110 to indicate the current extent of buffered information buffered in frame buffer 114. At operation 212, such end of data address may be updated by synchronizer 110 to producer status register 127 responsive to continuation of buffering at 201 of a frame of video data in a frame buffer 114. Synchronizer 110 may further include a consumer status register 128, a comparator 126, a controller 129, and a threshold monitor 125.

Indicating at 203 by consumer device 106 to synchronizer 110 a sub-frame amount of buffered information to be extracted or otherwise read out of frame buffer 114 may include operations at 213 and 214 for a tiling example. At operation 213, consumer device 106 may write an end of tile address to a consumer status register 128 of synchronizer 110 to indicate a sub-frame amount of buffered information to be extracted from a frame buffer 114 at a time, namely over one or more read clock cycles for a read operation, for tiling. At operation 214, an end of tile address may be updated by consumer device 106 to consumer status register 128 responsive to extracting or otherwise reading at operation 206 in order to increment by a sub-frame amount for purposes of tiling a portion of frame of video.

In a streaming example, operations at 213 and 214 may be the same except for the following differences. At operation 213, the subset of a data set may be a subset of entire rows of a frame of video data, respectively. At operation 213, consumer device 106 may write an end of row address to a consumer status register 128 of synchronizer 110 to indicate subset amount of buffered information to be extracted or otherwise read from a frame buffer 114 at a time, namely over one or more read clock cycles for a read, for subsequent streaming. At 214, a consumer device 106 may update an end of row address to consumer status register 128 responsive to extracting or otherwise reading to increment by a sub-frame amount for streaming a portion of a frame of video.

Hardware of video input/capture hardware pipeline 100 of FIG. 1 and sub-frame synchronization flow 200 may work with a software stack. Such a software stack may process buffered video data or other information on a dataset-by-dataset basis, such as a frame-by-frame basis, at operation 210. A software stack may be programmed in a general purpose computer, and hardware of video input/capture hardware pipeline 100 may be on a video expansion card slotted in a motherboard of such programmed general purpose computer or may be native to such motherboard.

Figure 3:
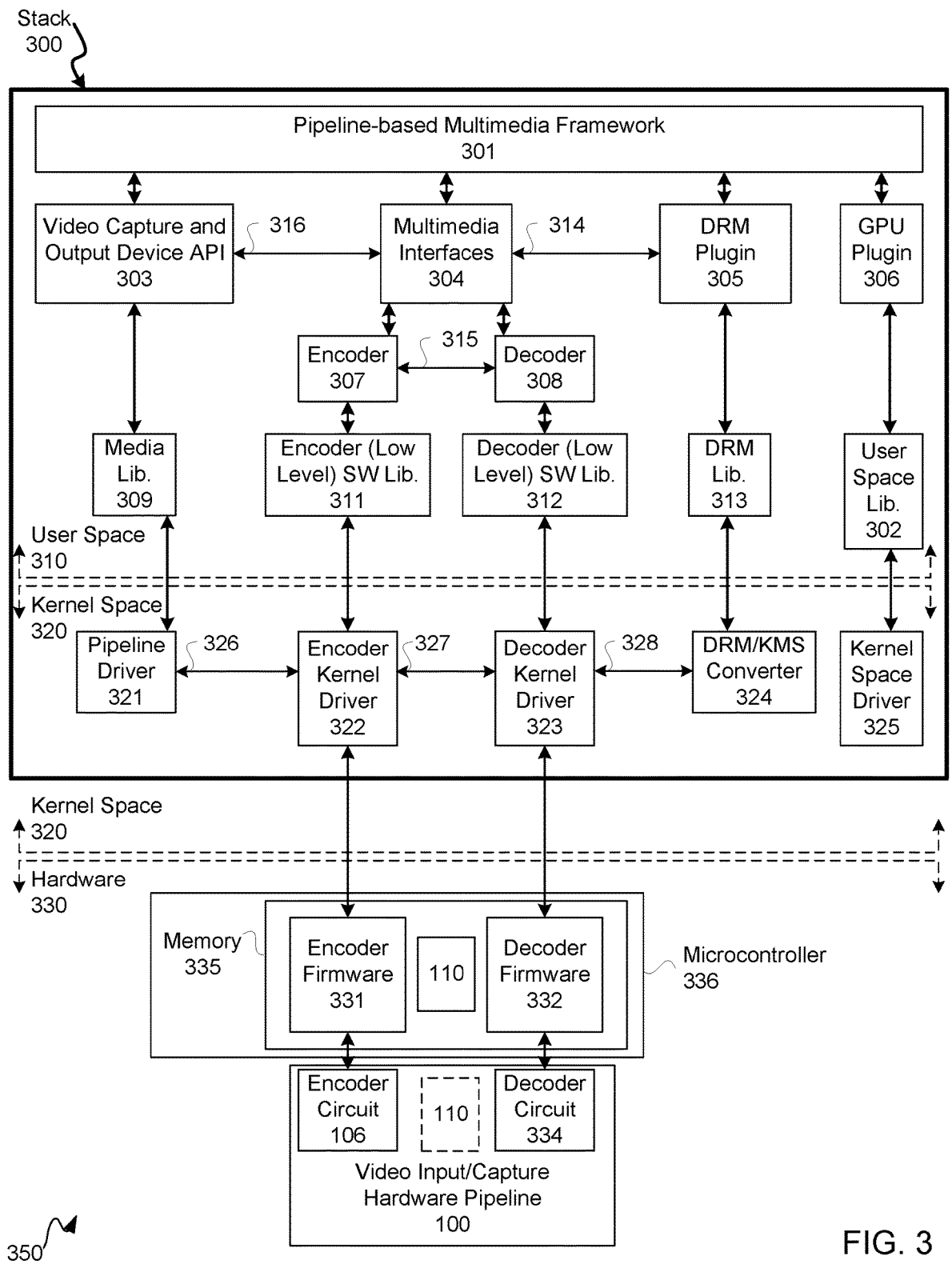
FIG. 3 is a block diagram depicting an exemplary software stack and hardware system.

FIG. 3 is a block diagram depicting an exemplary software stack 300 of an exemplary video processing system 350. Software stack 300 may be implemented in a user space 310 and an operating system kernel space 320 of a programmed data processing device, such as for example a programmed general purpose computer or other data processing device. Along those lines, a smart phone, a tablet, a notebook, or other data processing devices may be considered a programmed general purpose computer in addition to a personal computer workstation.

In this example, software stack 300 does not include encoder firmware 331 and decoder firmware 332, as code for these is in hardware 330. Encoder firmware 331 and decoder firmware 332 may be located or stored in hardware 330, such as for example memory 335 of hardware 330. Encoder firmware 331 may be for controlled operation of an encoder by a microcontroller 336, such as for controlling an encoder circuit 106 of video input/capture pipeline 100 of hardware 330. Memory 335 may be included in a microcontroller 336. Microcontroller 336 may be configured to handle interrupts and provide a hardware-to-software interface with software stack 300.

Microcontroller 336 may be configured to provide an interrupt to software stack 300 after a frame is completely processed, such as for example completely compressed or decompressed. In the above example, an interrupt per frame may be provided each 16.667 milliseconds; however, other frame rates may be used in other examples. Likewise, decoder firmware 332 may be for operation of a decoder by microcontroller 336 or another microcontroller, such as for controlling a decoder circuit 334 of video input/capture hardware pipeline 100. Microcontroller 336 may be configured to provide a synchronizer 110, or synchronizer 110 may be part of video input/capture hardware pipeline 100 as generally indicated with a dashed box.

Hardware 330 may include video input/capture hardware pipeline 100 as well as microcontroller 336. Hardware 330, as well as encoder firmware 331 and decoder firmware 332, is not part of software stack 300. Again, video input/capture hardware pipeline 100 may include an encoder circuit 106, a synchronizer 110, and a decoder circuit 334.

Encoder circuit 106 and decoder circuit 334 may be of a hardware codec, but are depicted separately for purposes of clarity. The term circuit is used to clearly delineate an encoder 307 and a decoder 308 in user space 310 from an encoder circuit 106 and a decoder circuit 334 in hardware 330.

A video encoder circuit 106 may be a video producer device or a video consumer device contextually dependent on position or state in a pipelined data flow. In this example, video encoder circuit 106 is a producer device circuit. A video decoder circuit 334 may be a video producer device or a video consumer device contextually dependent on position or state in a pipelined data flow. In this example, a video decoder circuit or a DMA display circuit 334 is a video consumer device.

A video encoder circuit 106 and a video decoder circuit 334 have a coordinated relationship with operation of a corresponding video encoder 307 and a video decoder 308 in software stack 300. Encoder firmware 331 and decoder firmware 332 are used to bridge communication between hardware and software for such coordination.

Encoder firmware 331 may be in communication with encoder circuit 106 and encoder kernel driver 322. Decoder firmware 332 may be in communication with decoder circuit 334 and decoder kernel driver 323.

Encoder kernel driver 322 and decoder kernel driver 323 of kernel space 320 may be in communication with one another for purposes of passing a buffer token or other buffer object 327. In an example below, buffer object 327 is for a DMA of a buffer, namely DMA_BUF token 327. However, in another example, another limit specific handle for a buffer may be used other than a DMA_BUF token. Software components of kernel space 320 and user space 310 may be considered components of software stack 300.

Software stack 300 may be configured for allocation of buffers for DMAs or other limit specific buffer access. Software stack 300 may further be configured for software management of encoder circuit 106 and decoder circuit 334 through communication with encoder firmware 331 and decoder firmware 332, respectively, in hardware 330. In the example below, a DMA memory involves having a contiguous memory space for a video frame buffer. For purposes of clarity by way of example and not limitation, software stack 300 is further described with reference to a Linux implementation; however, other forms of operating systems may be used.

In a Linux platform, a DMA mapping API (Application Program Interface) may be used. However, in another example, address mapping of memory may not be used. A DMA mapping API, which is a kernel specification in Linux, may be used to allocate DMA accessible memory buffer space in kernel space 320.

A DMA device, such as DMA accessible memory used to provide frame buffer memory 104 of FIG. 1, may still generate a write completed interrupt after a complete frame is written into such DMA device and/or may generate a read completed interrupt after a complete frame is read from such DMA device. A same interrupt signal ("interrupt") or separate read and write interrupts may be used to signal a complete write or read of a picture or a frame of video data. Along those lines, software stack 300 may operate on a frame-by-frame basis, even though hardware 330 is configured to operate on a sub-frame-by-sub-frame basis.

In the past, encoder circuit 106 waited to read data from DMA memory responsive to an interrupt from a write/capture DMA circuit 102 indicating a complete frame in frame buffer memory. Similarly, in the past, a display side DMA command was used to read data from DMA memory after a decoder circuit 334 indicates, such as by way of asserting a write complete interrupt, that a decoded picture or video frame was completely written into DMA memory.

Again, for the example of a 60 Hz frame rate, there may be a 16.667 millisecond latency or delay per frame. If there are five or more video pipeline stages, latency in the past may be a multiple of five or more instances of such a 16.667 millisecond delay. For example, if each video pipeline device in a video pipeline in kernel were to allocate its own buffer, then a copy step may be used to pass contents of one buffer to another buffer from one video pipeline device to another video pipeline device, respectively, in a video pipeline kernel. This copying operation may impose additional delay at higher frame rates and/or resolutions. Accordingly, frame copying from one buffer to a next buffer may impose considerable overhead that reduces performance, such as a reduction in frame rate and/or processing latency in a video pipeline.

However, by sharing a frame buffer as described herein, much of such latency may be avoided. Again, a buffer allocated by one component, such as a video producer device, is shared by a downstream component, such as a video consumer device, in a video pipeline. By sharing a buffer between video producer and consumer devices, operations, including a copy operation, in a video pipeline may be avoided, which may improve performance.

Further, latency may be reduced by sub-frame-by-sub-frame processing in hardware, while still having frame-by-frame processing in software. An interrupt is not asserted by a DMA memory to software for each sub-frame process, rather such interrupt from a DMA memory to software may still be on a frame-by-frame basis even with sub-frame-by-sub-frame processing in hardware. By handling sub-frame synchronization in hardware with frame synchronization is software, interrupts need not be provide to a software stack for each completed sub-frame, but may be provided to a software stack for each completed frame. In other words, if sub-frame synchronization was performed in software, then an interrupt would be issued for each sub-frame which would significantly negatively impact performance. However, by having sub-frame synchronization in hardware with frame synchronization in software, interrupts to software do not need to be provided for each sub-frame but can be provided for each completed frame.

In Linux, a synchronization framework may be used to share a file descriptor ("FD") of a DMA buffer, namely a DMA_BUF_FD, across a video processing pipeline in software stack 300.

Returning to FIG. 3, kernel space 320 may include a pipeline driver 321, a Direct Rendering Manager/Kernel Mode Setting ("DRM/KMS") converter 324, and a kernel space driver 325. Encoder kernel driver 322 may be in communication with pipeline driver 321 for purposes of communication of a DMA_BUF token 326 indicating a DMA buffer limit or "fence." Such DMA buffer limit or fence may be for allocation of buffer space in buffer memory on a frame-by-frame basis.

Decoder kernel driver 323 may be in communication with DRM/KMS converter 324 for purposes of communication of a DMA_BUF token 328 indicating a DMA buffer border of "fence." Accordingly, buffer allocation may be coordinated among components, such as components 321-324, in kernel space 320 by passing DMA_BUF tokens. These DMA_BUF tokens or other objects may be used to delineate shared address spaces in buffer memory, such as frame buffer memory 104 for example, to effectively provide DMA buffer "fences."

A DMA_BUF fence is a segmentation object attached to or associated with a buffer. A producer device may produce or write data into a buffer, which buffer is shared by one or more downstream consumer devices. So, a DMA_BUF fence is a signaling mechanism that allows a producer device to signal completion of a frame to one or more downstream consumer devices at one time.

Again, a video source or producer device, such as a video receiver such as an HDMI or DisplayPort receiver for example, may be a source of frames written or loaded into a buffer in a stage of a video pipeline, and a video sink or consumer device, such as a video transmitter such as an HDMI or DisplayPort transmitter for example, may be a device reading or otherwise extracting video data from a buffer in a stage of a video pipeline. However, a video source may be a camera input, and a video sink may be a file or a network streaming endpoint. In another example, a video source may be a file, and a video sink may be another file. In yet another example, a video source may be a network stream, and a video sink may be a display device. These are but a few of many video source-to-video sink configurations.

Software stack 300 operates at a frame-by-frame level, even though video input/capture hardware pipeline 100 operates at a sub-frame-by-sub-frame level. This allows hardware 330 to effectively communicate interrupts to software stack 300 for each completed frame transaction, even though video input/capture hardware pipeline 100 operates at a sub-frame-by-sub-frame level.

As previously described, hardware-based synchronization of frame buffer sharing is at a sub-frame-by-sub-frame level, though an interrupt to software stack 300 is for a completely processed, encoded or decoded, entire frame.

A video pipeline provided by software stack 300 may operate in a frame granularity, and a video input/capture hardware pipeline 100 in hardware 330, in communication with software stack 300, may operate in a sub-frame granularity. This sub-frame granularity may be for an encoder circuit, display DMA device, or other video consumer device in hardware to start its operation without waiting for an entire video frame to be buffered in a shared video frame buffer with a video producer device in hardware. Sub-frame granularity may be provided with synchronization circuits in hardware to manage buffering, including buffering thresholds, and to generate synchronization events to a video consumer device. Because sub-frame synchronization is provided in hardware, any sub-frame level interaction between software stack 300 and hardware 330 may be avoided. By avoiding any such sub-frame level interaction between software stack 300 and hardware 330, system performance may be enhanced in the form of less video processing latency, as well as an avoidance of sub-frame level interrupts. Additionally, complexity of software stack is not significantly changed, as buffer allocation is shifted from having separate buffers to shared buffers.

In user space 310 of software stack 300, there may be a pipelined-based multimedia framework 301 in communication with a video capture and output device API 303, multimedia interfaces 304, a direct rendering manager (DRM) plugin 305, and optionally a GPU (graphics processing unit) plugin 306. GPU plugin 306 may be in communication with a user space library 302 of user space 310 for such GPU plugin 306, and user space library 302 may be in communication with kernel space driver 325. In an example, user space library 302 may be an ARM *Mali* GPU user space library, and likewise kernel space driver 325 may be an ARM *Mali* kernel space driver. However, this GPU chain may operate independently of video encoding and decoding, and thus unnecessary details regarding same are not provided for purposes of clarity.

In this example, pipeline-based multimedia framework 301 may be a Gstreamer application. Along those lines, video capture and output device API 303 may be a V4L2 plugin, and multimedia interfaces 304 may be provided by Gstreamer-to-OMX (Open-Media Acceleration) interfaces.

Video capture and output device API 303 may be in communication with a media library 309 of user space 310, and media library 309 may be in communication with pipeline driver 321. Continuing the above example, media library 309 may be a V4L2 media library, and pipeline driver 321 may be a V4L2 pipeline driver for subdev0, 1, 2, etc.

Multimedia interfaces 304 may be in communication with encoder 307 and decoder 308 in user space 310. Further in user space 310, encoder 307 may be in communication with an encoder SW (software) library 311, and decoder 308 may be in communication with a decoder SW library 312.

Continuing the above example, encoder 307 and decoder 308 may respectively be an OMX encoder and an OMX decoder. Encoder SW library 311 and decoder SW library 312 may respectively be an encoder low level control SW library and a decoder low level control SW library. Libraries 311 and 312 may respectively be in communication with encoder kernel driver 322 and decoder kernel driver 323.

DRM plugin 305, which is a subsystem of a Linux kernel to expose an API that user-space programs can use to send commands and data to a GPU and configure mode settings of a display for example, may be in communication with a DRM library 313 in user space 310. DRM library 313 may be in communication with DRM/KMS converter 324.

Video capture and output device API 303 and multimedia interfaces 304 may communicate DMA buffer file descriptors 316 to one another. Multimedia interfaces 304 and DRM plugin 305 may communicate DMA buffer file descriptors 314 to one another. Encoder 307 and 308 may communicate DMA buffer file descriptors 315 to one another.

With the above description borne in mind, operation of hardware 330 and software stack 300 is further described.

Encoder circuit 106 and decoder circuit 334 may be configured to generate completion interrupts after each frame is processed respectively through them. Depending on a target bit rate, GOP (Group-of-Pictures) structure, and GOP length, frame encoding and decoding time, namely encoding or compression latency and decoding or decompression latency, may be multiples of duration of a video frame. However, as is known, compression latency and decompression latency may each be reduced to a single frame duration using targeted GOP structure and bit rate. Single frame duration latency may be insufficient for some applications, such as for example some AR and VR applications.

Along those lines, encoder circuit 106 and decoder circuit 334 are configured for operation in a sub-frame boundary instead of a frame boundary. Of course a last sub-frame boundary of a frame may be a frame boundary; however, each sub-frame operation on a frame including a last sub-frame operation thereof is operative on a sub-frame boundary.

Figure 4:
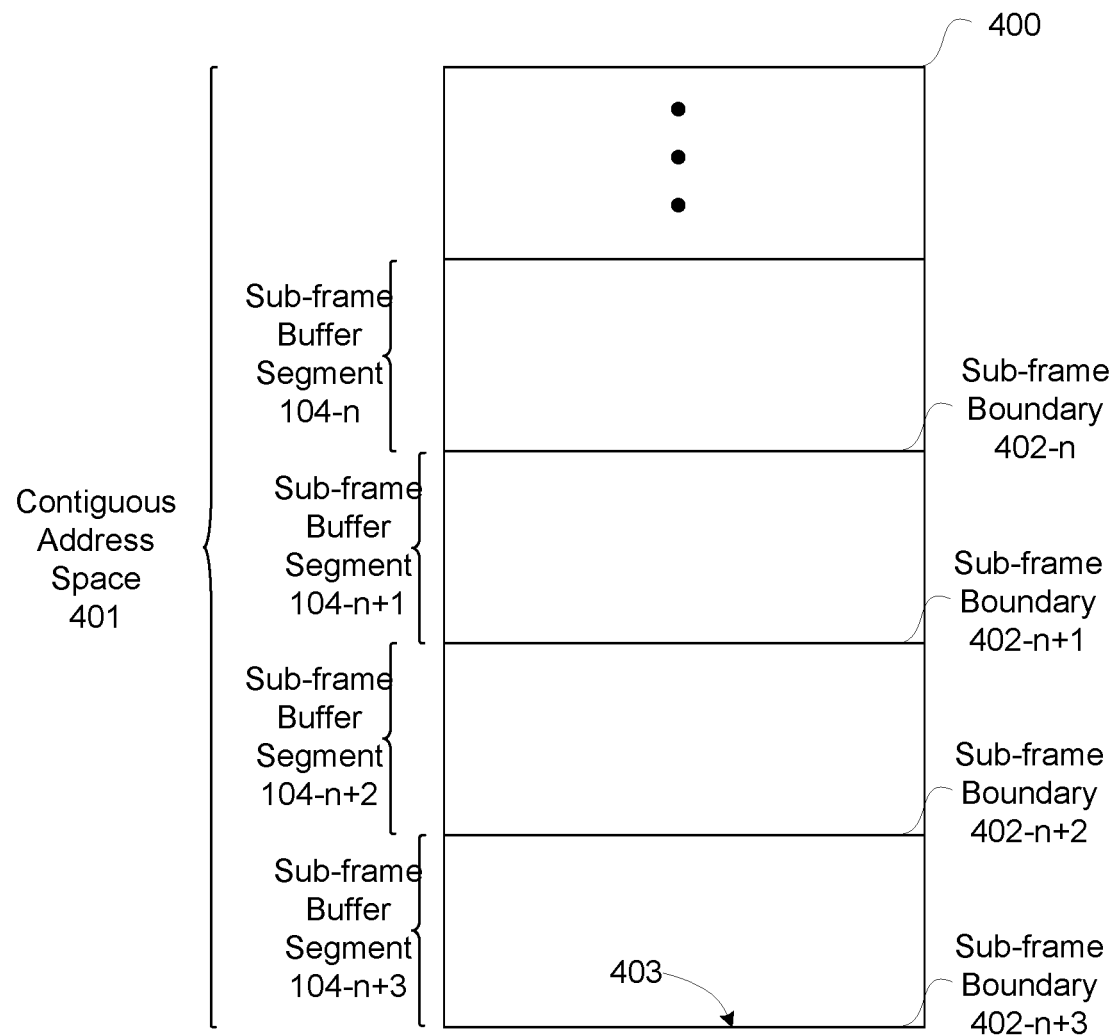
FIG. 4 is a block diagram depicting an exemplary mapped memory.

FIG. 4 is a block diagram depicting an exemplary mapped memory 400. Mapped memory 400 is just one example, and in other examples unmapped memory may be used. However, for purposes of clarity by way of example and not limitation, it shall be assumed that mapped memory 400 is used. Along those lines, mapped memory 400 has addresses in common as between producer and consumer devices. Mapped memory 400 is further described with simultaneous reference to FIGS. 1 through 4.

Mapped memory 400 represents a contiguous address space 401, such as may be used for a video frame buffer. However, mapped memory 400 is divided into multiple sub-frame buffer memories, such as sub-frame buffer segments 104-n through 104-n+3 for n a positive integer. Adjacent sub-frame buffer segments 104-n through 104-n+3 may be divided by sub-frame boundaries 402-n through 402-n+3, respectively. If frame buffer segment 104-n+3 happened to be a last segment in a frame, then DMA buffer fence 403 would be both a sub-frame boundary 402-n+3 and a frame boundary.

Mapped memory 400 may appear to software stack 300 at a kernel space 320 or kernel level as multiple frame buffers in a contiguous address range, where each of such frame buffers is for buffering at least one complete video frame. Again, for purposes of clarity by way of example and not limitation, it shall be assumed that each frame buffer memory 400 is for only one video frame or picture at a time.

With reference to FIGS. 1 through 4, a mapped memory 400 may be a frame buffer memory 400. Frame buffer memory 400 may span a contiguous address space or range 401 of a memory die or dies forming such space or range. A frame, and thus address range 401, may be divided into multiple vertical or horizontal segments or sub-frames. A frame buffer memory 400 may hold more than one frame's worth of information at a time; however, for purposes of clarity by way of example and not limitation, it shall be assumed that only the amount of data for one frame is held at a time. Along those lines, for pipelined processing of a sub-frame followed by another sub-frame and so on, a frame buffer memory may hold one or more sub-frames from a same frame or different frames, the latter of which may be two adjacent frames in a sequence.

In this example, a contiguous portion of contiguous address space 401 is used to provide a sequence of four frame buffer segments 104-n through 104-n+3 of a frame buffer 104 for n a positive integer. Each frame buffer segment may be delineated from an immediately adjacent frame buffer segment by a sub-frame boundary, as generally indicated as a spaced apart sequence of sub-frame boundaries 402-n through 402-n+3 corresponding to ends of frame buffer segments 104-n through 104-n+3.

Each amount of video data in a sub-frame, namely a video frame segment, may be individually encoded or individually decoded. With continued simultaneous reference to FIGS. 1 through 4, encoder circuit 106 and decoder circuit 334 may start their respective video compression and video decompression consumer device operations after a video frame segment is loaded into a corresponding frame buffer segment, such as frame buffer segment 104-n for example. Thus, a video compression or a video decompression may commence immediately after frame buffer segment 104-n is finished filling but before frame buffer segment 104-n+1 is full.

By operating at a sub-frame level, buffer latency, such as capture buffer or display buffer latency for example, may be reduced to one sub-frame instead of a full frame on an encoding side or on a display side. In other words, once a sub-frame fill level is exceeded in a frame buffer, an encoder circuit or other consumer device may read from such frame buffer the data therein up to such sub-frame fill level while a next sub-frame is being written. Along those lines, dual-ported memory for simultaneous reading and writing may be used for a frame buffer. On a display side, a display DMA can start fetching data from frame buffer memory as soon as a decoded picture buffer is above a sub-frame boundary, such as sub-frame boundary 402-*n*, while a next sub-frame is being loaded into such frame buffer.

Accordingly, by pipelining sub-frames, one sub-frame loaded into a buffer may be read while another sub-frame is being loaded. Thus, rather than a one frame latency, a sub-frame latency may be provided. However, operating a video pipeline at a sub-frame level involves video buffering synchronization across different stages of such a video pipeline, such as previously described.

A kernel framework as described herein allows video compression and decompression operations to occur in a frame boundary. As previously described, kernel DMA frameworks, including DMA_BUF frameworks, may be used even though sub-frame level synchronization is provided in hardware 330. Multimedia frameworks, such as provided by Gstreamer for example, do not handle operation below frame granularity. By integrating sub-frame processing capabilities in hardware 330, software stack 300 may continue to operate at a frame boundary level.

A DMA_BUF framework is provided for synchronization by using "DMA_Buf fences" in kernel space 320. Again, a producer device generates synchronization events for a consumer device by filling a buffer. After a buffer has reached a sub-frame fill level, such buffer is available for a consumer device for reading and further processing of data. Synchronization between hardware 330 and software stack 300 involves software-based handshaking using DMA buffer ("DMA_Buf") "fences" or boundaries. Such "DMA_Buf fences" may be used in kernel space 320, while using hardware-based synchronization for sub-frame level buffer sharing.

Such DMA_Buf fences provide a framework for allowing an application or user space 310 level synchronization of frame-by-frame processing to be offloaded into kernel space 320. Addition of DMA_Buf fences allows a producer device to queue up or enque a buffer and a consumer device to queue up or enque a same buffer for buffer sharing and allows a video pipeline to run with frame-by-frame synchronization handled by use of such DMA_Buf fences in kernel space 320. A hardware offload is then provided to such DMA_Buf fences, where such hardware offload is for sub-frame-by-sub-frame synchronization. Along those lines, a DMA buffer input to a producer device driver includes DMA_Buf fence. An index provided by such DMA_Buf fence effectively may be wired or otherwise implemented in hardware in a producer device circuit. In an example, a DMA may directly signal a DMA_Buf fence in hardware.

A video pipeline provided by software stack 300 and hardware 330 works in a frame granularity except: encoder circuit 106 starts its operation without waiting for an entire video frame to be buffered; and a display DMA device does not wait for an entire display frame to be buffered before outputting displayable content. Rather, encoder circuit and a display DMA device operate at a sub-frame level. Synchronization circuits in hardware 330 manage buffering thresholds and generate synchronization events for consumer devices, such as previously described. Because sub-frame synchronization is performed in hardware, sub-frame level interaction between hardware 330 and software stack 300 may be avoided. Thus, interrupts provided from hardware 330 to software stack 300 may be on a frame-by-frame basis, rather than a sub-frame-by-sub-frame basis.

Returning to FIG. 2, operations 201-206 may be performed in hardware 330, including operations 211-214. However, an overall frame-by-frame operation 210 may be performed by software stack 300. At 206, an interrupt 207 or other indication may be provided from hardware 330 to indicate a frame is completely processed. In response to such interrupt, at 210, buffered information may be processed on a frame-by-frame basis by a software stack 300 in communication with video processing hardware 330, including one or more synchronizers, producer devices, and consumer devices. Again, a consumer device may be a video encoder for example, or a consumer device may be a display device for example. In hardware, a consumer device may consume such buffered information on a sub-frame-by-sub-frame basis, such as by an encoder or a DMA display device.

Figure 5:
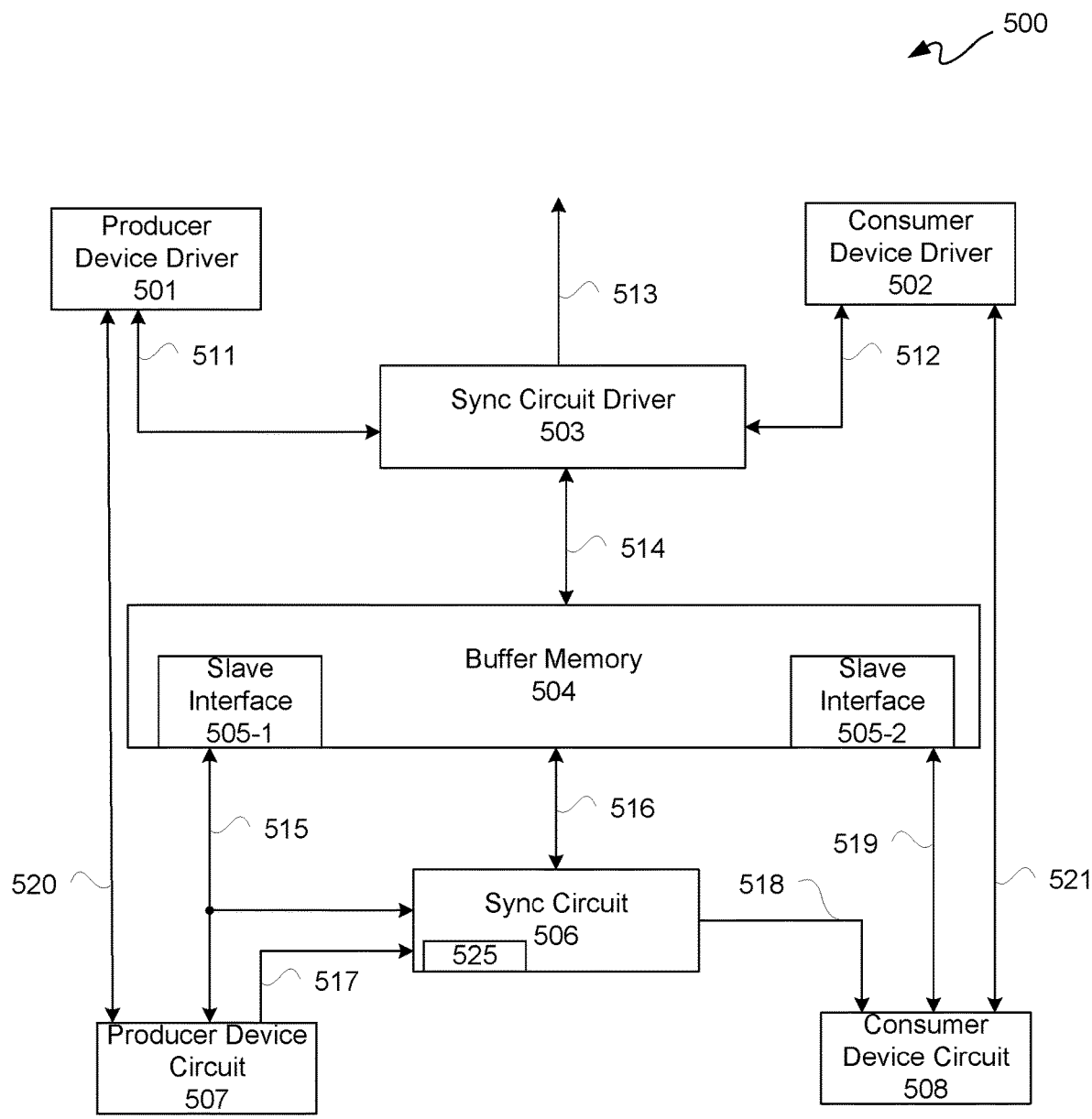
FIG. 5 is a block diagram depicting a software/hardware interface.

FIG. 5 is a block diagram depicting a software/hardware interface 500. Software/hardware interface 500 is simplified for purposes of clarity and not limitation, as software/hardware interface 500 follows from the above description.

A producer device driver 501 is in communication 520 with a producer device circuit 507. A consumer device driver 502 is in communication 521 with a consumer device circuit 508. A sync or synchronization circuit driver 503 is in communication 511 with producer device driver 501 and in communication 512 with consumer device driver 502. Sync circuit driver 503 may provide a flag or interrupt 513.

Sync circuit driver 503 may be in communication 514 with buffer memory 504. Buffer memory 504 may have a slave interface 505-1 and a slave interface 505-2. Producer device circuit 507 may be in communication 515 with slave interface 505-1. Consumer device 508 may be in communication 519 with slave interface 505-2 to provided processed video data for buffering in buffer memory 504, and such processed video data, such as compressed or decompressed video data for example, may be subsequently processed by a data processing device having software stack 300 of FIG. 3 programmed therein.

Producer device circuit 507 may be in communication 515 with sync circuit 506. Sync circuit 506 may be in communication 516 buffer memory 504. Sync circuit may be in communication 518 with consumer device circuit 508.

Along the above lines, communication 517 may include a sync event start signal 517, and communication 518 may include a sync event signal 518. Communications 515 and 519 may include signaling for respective double-data rate (DDR) interfaces a communication protocol for buffer memory being a DDR memory.

With the above architecture borne in mind, operation of a software/hardware interface 500 is further described. A synchronization element may be defined as an entity responsible for establishing buffer synchronization between a producer element and a consumer element. However, a synchronization element includes a software portion and a hardware portion. In this example, a sync circuit driver 503 provides a software portion, and a sync circuit 506 provides a hardware portion. Likewise, a producer device element includes a producer device driver 501 in software and a producer device circuit 507 in hardware, and a consumer device element includes a consumer device driver 502 in software and a consumer device circuit 508 in hardware.

A bus protocol, which may be used for communication in software/hardware interface 500, may be a protocol used for accessing data from a memory device, such as DDR buffer memory 504 in this example. In addition to such bus protocol, side band connectivity may be provided for side band information communication between a synchronization element and producer and consumer elements. Such side band connectivity may be provided via a sync event interface.

A sync event interface may include a sync event start signal 517 generated by a producer device circuit to indicate state of buffer synchronization. Sync circuit 506 may trigger a buffer threshold reached signal based on a bus protocol's valid-ready count obtained from buffer memory 504. Sync circuit 506 may generate a sync event signal 518 for consumer device circuit 508 responsive to a sub-frame threshold having been reached in buffer memory 504.

In response to sync event signal 518, consumer device circuit 508 may start fetching data in a producer or source buffer in buffer memory 504 for such sub-frame segment responsive to assertion of sync event signal 518. A start address for such fetch or read of buffer memory 504 by consumer device circuit 508 may programmed using sync circuit driver 503.

Figure 6:
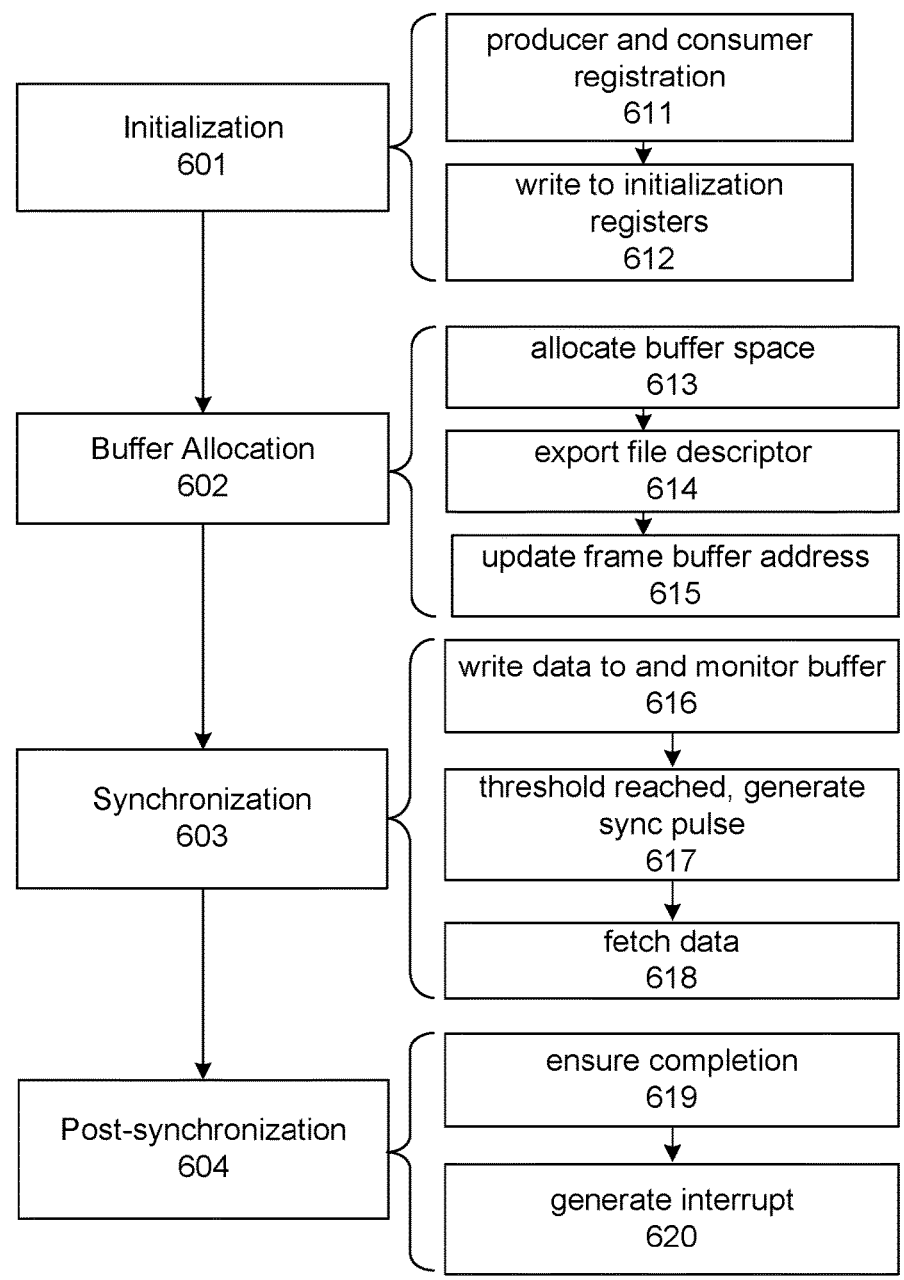
FIG. 6 is a flow diagram depicting an exemplary sub-frame synchronization flow in accordance with the software/hardware interface of FIG. 5.

FIG. 6 is a flow diagram depicting an exemplary sub-frame synchronization flow 600 in accordance with software/hardware interface 500 of FIG. 5. Synchronization flow 600 is for writing and reading data from a shared frame buffer memory; however, sub-frame synchronization flow 600 may be used with forms of data other than video data. With additional reference to FIG. 5, sub-frame synchronization flow 600 is further described.

At 601, initialization is performed. Operations at 611 and 612 may be performed for initialization at 601. At 611, producer device circuit 507 via producer device driver 501 and consumer device circuit 508 via consumer device driver 502 registers with sync circuit driver 503. In response to such registration, at operation 612 sync circuit driver 503 may write to initialization registers 525 of sync circuit 506 as part of initialization at 601.

At 602, buffer allocation is performed. Operations at 613, 614, and 615 may be performed for buffer allocation at 602. At 613, one or more of drivers 501-503 may allocate buffer space in buffer memory 504. At 614, one or more of drivers 501-503 may export one or more file descriptors for application level synchronization. At 615, one or more of drivers 501-503 may update a sync circuit 506 with a frame buffer address in buffer memory 504.

At 603, synchronization is performed. Operations at 616, 617, and 618 may be performed for synchronization at 603. At 616, sync circuit 506 monitors buffer memory 504 for a video sub-frame threshold having been reached in buffer memory 504. Along those lines, a producer device circuit 507 is writing video data to buffer memory 504 at 616. At 617, sync circuit 506 generates a sync pulse and provides same, such as via sync event signal 518, to consumer device circuit 508 in response to such video sub-frame threshold having been reached as detected responsive to monitoring at 616. At 618, assertion of such a sync pulse causes consumer device circuit 508 to fetch a sub-frame amount of data associated with such threshold having been reached from buffer memory 504.

At 604, post-synchronization is performed. Operations at 619 and 620 may be performed for post-synchronization at 604. At 619, sync circuit 506 may be configured to ensure a prior sub-frame synchronization is completed, including fetching an entire sub-frame of data by a consumer device circuit 508, before a next sub-frame of data is allowed to be fetched by consumer device circuit 508 from buffer memory 504. At 620, consumer device circuit 508 or sync circuit 506 may generate an interrupt to indicate an entire video frame has been processed, such as compressed or decompressed. Such interrupt or flag 513 may be provided via sync circuit driver 503 for a software stack. Again, even though hardware may operate by pipelined processing of sub-frames one after another, software stack 300 of FIG. 3 operates on a frame-by-frame basis, namely at frame boundaries. Such frame triggered interrupt may be used to inform a software stack of processing of an entire frame for frame-by-frame synchronized operation.

Figure 7:
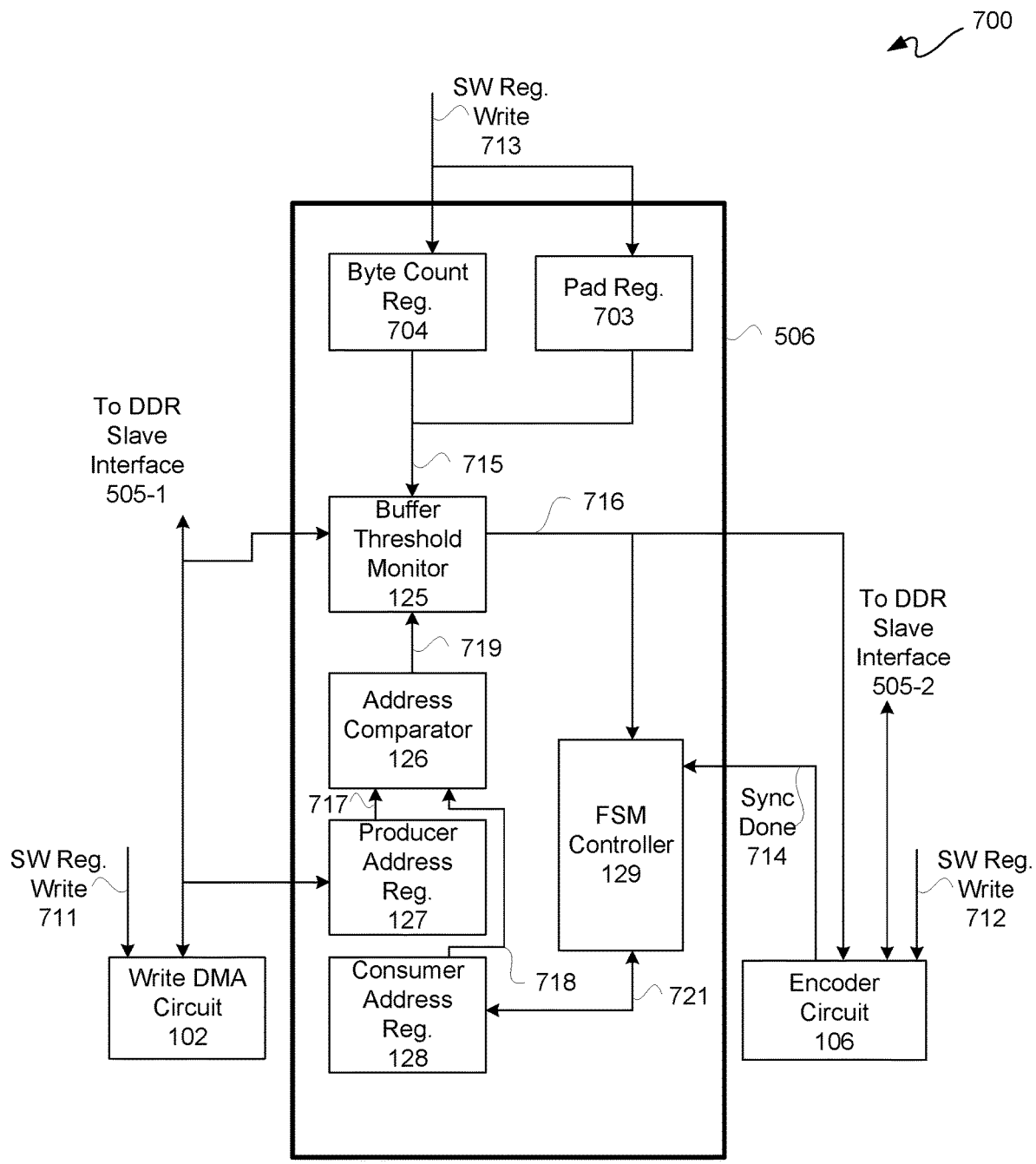
FIG. 7 is a block diagram depicting an exemplary sub-frame synchronization circuit.

FIG. 7 is a block diagram depicting an exemplary sub-frame synchronization circuit 700. Sub-frame synchronization circuit 700 may be used to establish handshaking in accordance with sub-frame synchronization flow 600 of FIG. 6. Sub-frame synchronization circuit 700 is further described with simultaneous reference to FIGS. 1-7. Sub-frame synchronization circuit 700 may be of a programmable logic device circuit, such as of an FPGA for example.

A software (SW) register write 711 may be made to write DMA circuit 102, namely a producer device in this example. Such software register write 711 may be sourced from a producer device driver 501 for write DMA circuit 102. For purposes of clarity by way of example and not limitation, assume write DMA circuit 102 is an HDMI receiver, even though in other examples another type of video producer device may be used. Such write 711 may be to initialize write DMA circuit 102 to begin capturing video data and to write such captured video data into frame buffer memory 504.

Likewise, a software register write 712 may be made to encoder circuit 106, namely a consumer device in this example. Such software register write 712 may be sourced from a consumer device driver 502 for encoder circuit 106. Such write 712 may be to initialize encoder circuit 106 to read video data from frame buffer memory 504 and to write encoded video data into frame buffer memory 504. Along those lines, an encoder circuit 106 may be configured to have a set number of rows or tile size to read at a time from frame buffer memory 504.

Software register writes 711 and 712 may be used for sharing a same frame buffer between write DMA circuit 102 and encoder circuit 106. Furthermore, such software register writes 711 and 712 may be used to provide an index such that both write DMA circuit 102 and encoder circuit 106 point to a same sync circuit 506.

A sync circuit 506 in this example of a sub-frame synchronization circuit 700 includes a finite state machine (FSM) controller 129, a consumer address register 128, a producer address register 127, an address comparator 126, a buffer threshold monitor 125, a byte count register 704, and a pad register 703. One or more of registers 703, 704, 127 and 128 may be initialization register 525.

A software (SW) write 713 to byte count register 704 and pad register 703 may be performed to write a sub-frame byte count plus padding register value 715. Padding may be optional, and thus pad register 703 may be optional.

Buffer threshold monitor 125, which may be implemented as a counter, may be used to establish that data written to frame buffer memory 504 is valid up to some address by counting. Buffer threshold monitor 125 may be coupled to a write DMA circuit 102 via a slave interface 505-1 connection to frame buffer memory 504 to snoop for a bus protocol write valid and ready handshake provided via such slave interface. For HDMI, when a frame starts there is associated start-of-frame signaling. This signaling may be used as a handshake. However, in another example, rather than a start-of-frame signal, an address update signal from write DMA circuit 102 may be used. From a write valid and ready handshake, buffer threshold monitor 125 may count the number of valid bus words. In this example, a byte is considered an 8-bit word; however, in other examples other word lengths may be used.

When a count of valid bus words by buffer threshold monitor 125 exceeds a sub-frame byte count and pad register value 715, buffer threshold monitor 125 generates a sync event signal 716 for a consumer device, such as encoder circuit 106, and for FSM controller 129.

As write DMA circuit 102 writes data into a shared frame buffer memory 504, write DMA circuit 102 provides an updated address indicating progress of such write data in such frame buffer memory 504. This updated address signal may be provided to producer address register 127 to provide an indication of how much of a frame has been written into frame buffer memory 504 by write DMA circuit 102 for a current frame. For example, if two lines or rows of a frame are written into frame buffer memory, an updated address value may be an end address of a second of such two lines. While such write in this example is a memory mapped write to a register, in another example wiring may be used to directly provide such value.

Address comparator 126 may be coupled to receive a producer address 717 from producer address register 127 and a consumer address 718 from consumer address register 128. Address comparator 126 may effectively compare a protocol's address from a master device, such as write DMA circuit 102, for a match with a value programmed into consumer address register 128 with a driver write, such as software register write 712 or 713. An indication that a consumer address 718 is written into consumer address register 128 may be provided as an addresses written signal 721 to FSM controller 129. This consumer address 718 may be updated for each next sub-frame of data.

Address comparator 126 compares such address values 717 and 718, and if a match occurs or if a producer address exceeds a consumer address, address comparator may generate or assert a counter activation or enable signal 719 to buffer threshold monitor 125. Effectively, this causes buffer threshold monitor 125 to start counting toward a threshold.

Encoder circuit 106 generates a sync done signal 714 once a sub-frame buffer or sub-frame amount of data is read from frame buffer memory 504. Encoder circuit 106 begins access to frame buffer memory 504 for each sub-frame amount of data. Such sync done signal 714 is provided to FSM controller 129. FSM controller 129 manages synchronization between producer and consumer devices, such as respectively between write DMA circuit 102 and encoder circuit 106 in this example, using sync event signal 716 and sync done signal 714.

This is just one example of a sync circuit 506. However, in another example, sync circuit 506 may be implemented using a microcontroller and associated control interfacing.

Rather than a software-only based synchronization which suffers from performance issues, synchronization in hardware and software provides enhanced performance over synchronization in just software. Furthermore, by dividing a video frame into multiple sub-frames, a software synchronization would be bottlenecked for handling multiple synchronization events for each sub-frame. However, by having sub-frame synchronization in hardware with frame synchronization in software, such bottleneck of having multiple interrupts to software for sub-frame synchronization may be avoided. Along those lines, hardware sub-frame synchronization as described herein does not impose any modification to an existing operating system framework for providing such sub-frame level video processing. As described above, an open source Linux software stack can be used to process video at frame boundaries without considerable modification of such software stack for implementing sub-frame handling.

As described above, exchanging or sharing of buffers across multiple components may be transparent or invisible to an upper software stack. Additionally, a sync circuit may handle multiple pairs of producer and consumer circuits, such as for a capture DMA encoder and decoder-display DMA among other pairs.

Figure 8:
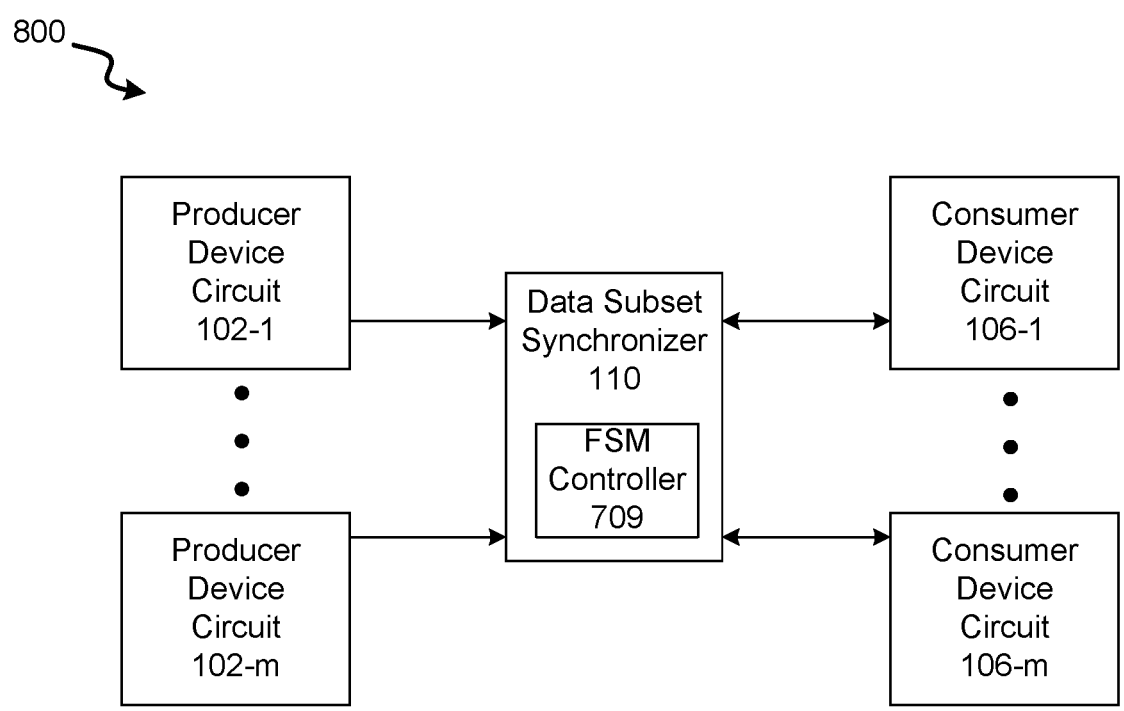
FIG. 8 is a block diagram depicting an exemplary video processing subsystem having multiple pairs of producer-consumer devices.

For example, FIG. 8 is a block diagram depicting an exemplary video processing subsystem 800 having multiple pairs of producer-consumer devices. Video processing subsystem 800 may be implemented in hardware 330 of FIG. 3 for sub-frame processing of video data by each of such pairs.

Producer device circuits 102-1 through 102-$m$ for m a positive integer greater than one may be coupled to corresponding consumer device circuits 106-1 through 106-$m$ to form producer-consumer pairs. Such producer device circuits 102 may be coupled to corresponding consumer device circuits 106 through a single data subset synchronizer 110.

In this example, data subset synchronizer 110 includes an FSM controller 709, which may be an FSM controller 129 configured to handle multiple producer-consumer pairs. This allows FSM controller 709 to be common for multiple producer-consumer pairs. Having a single FSM controller 709 for sub-frame synchronization for multiple producer-consumer pairs may be useful for sequencing operations. Additionally, a sync circuit, such as synchronizer 110 or 506, may be embedded into interconnect circuits, such as of an FPGA for example, to avoid consumer device stalling when a consumer device reads a buffer before a producer device completes a sub-frame write for such read, namely a read-before-write condition, of frame buffer memory.

A sync circuit and driver therefor may be extended to support producer device metadata for intelligent synchronization processing. For example, a planar format may be passed through metadata for synchronization across interleaved writes, where such synchronization may be handled inside a synchronization element. A metadata structure containing properties of frame buffer data can be exchanged between producer and consumer devices, and such a mechanism is not limited to sub-frame synchronization. For example, a planar data format, which has separate chroma and luma planes, may be handled by software. However, with synchronization hardware as described herein, both producer and consumer devices can be made aware of separate chroma and luma pointers, and so such producer and consumer devices may write to/read from memory without having to have any involvement from controlling software, which may save CPU processing bandwidth.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 9:
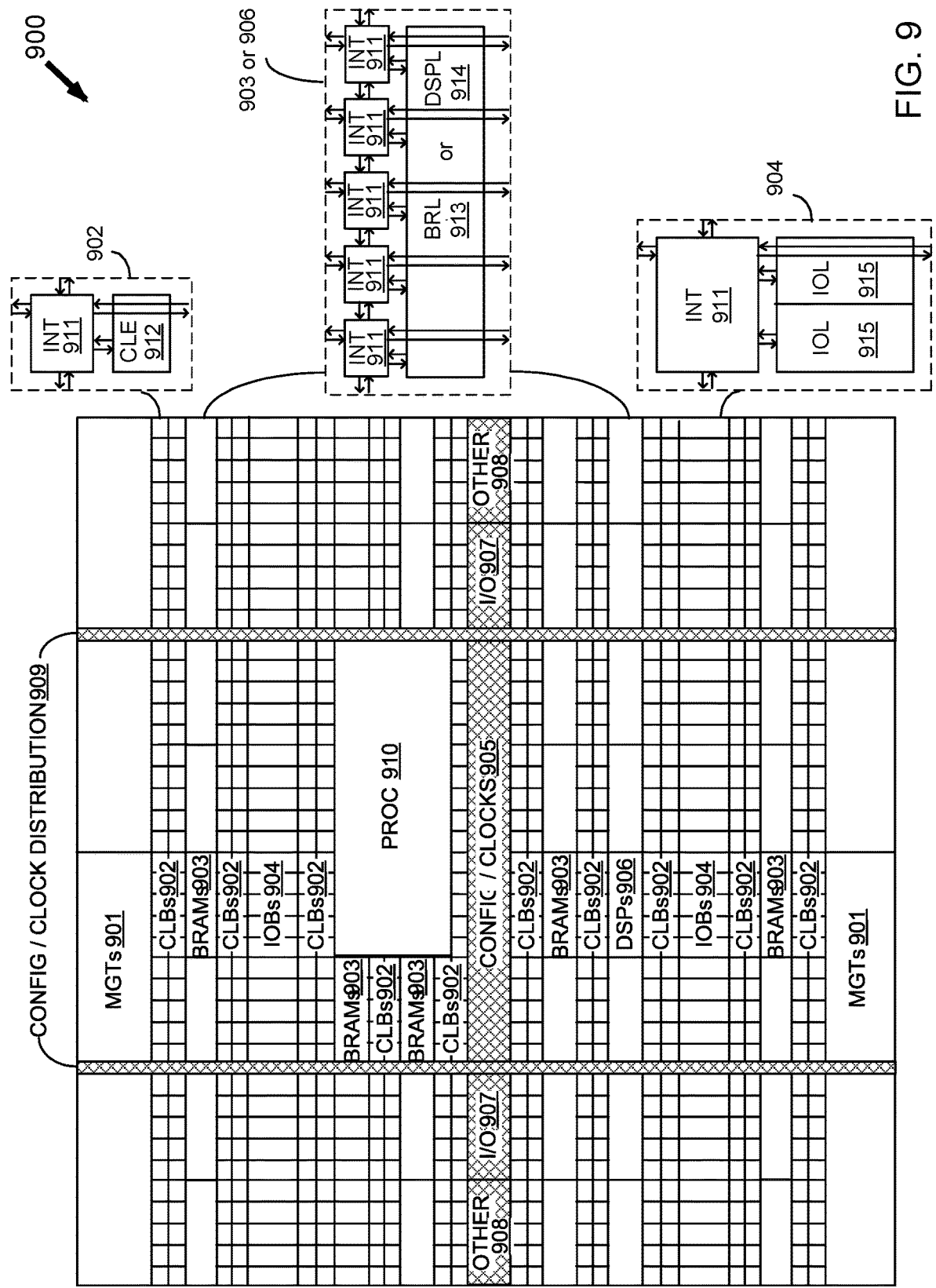
FIG. 9 is a simplified block diagram depicting an exemplary columnar Field Programmable Gate Array ("FPGA") architecture.

As noted above, advanced FPGAs can include several different types of programmable logic blocks in the array. For example, FIG. 9 illustrates an FPGA architecture 900 that includes a large number of different programmable tiles including multi-gigabit transceivers ("MGTs") 901, configurable logic blocks ("CLBs") 902, random access memory blocks ("BRAMs") 903, input/output blocks ("IOBs") 904, configuration and clocking logic ("CONFIG/CLOCKS") 905, digital signal processing blocks ("DSPs") 906, specialized input/output blocks ("I/O") 907 (e.g., configuration ports and clock ports), and other programmable logic 908 such as digital clock managers, analog-to-digital converters, system monitoring logic, and so forth. Some FPGAs also include dedicated processor blocks ("PROC") 910.

In some FPGAs, each programmable tile includes a programmable interconnect element ("INT") 911 having standardized connections to and from a corresponding interconnect element in each adjacent tile. Therefore, the programmable interconnect elements taken together implement the programmable interconnect structure for the illustrated FPGA. The programmable interconnect element 911 also includes the connections to and from the programmable logic element within the same tile, as shown by the examples included at the top of FIG. 9.

For example, a CLB 902 can include a configurable logic element ("CLE") 912 that can be programmed to implement user logic plus a single programmable interconnect element ("INT") 911. A BRAM 903 can include a BRAM logic element ("BRL") 913 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 906 can include a DSP logic element ("DSPL") 914 in addition to an appropriate number of programmable interconnect elements. An IOB 904 can include, for example, two instances of an input/output logic element ("IOL") 915 in addition to one instance of the programmable interconnect element 911. As will be clear to those of skill in the art, the actual I/O pads connected, for example, to the I/O logic element 915 typically are not confined to the area of the input/output logic element 915.

In the pictured embodiment, a horizontal area near the center of the die (shown in FIG. 9) is used for configuration, clock, and other control logic. Vertical columns 909 extending from this horizontal area or column are used to distribute the clocks and configuration signals across the breadth of the FPGA.

Some FPGAs utilizing the architecture illustrated in FIG. 9 include additional logic blocks that disrupt the regular columnar structure making up a large part of the FPGA. The additional logic blocks can be programmable blocks and/or dedicated logic. For example, processor block 910 spans several columns of CLBs and BRAMs.

Note that FIG. 9 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 9 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 10:
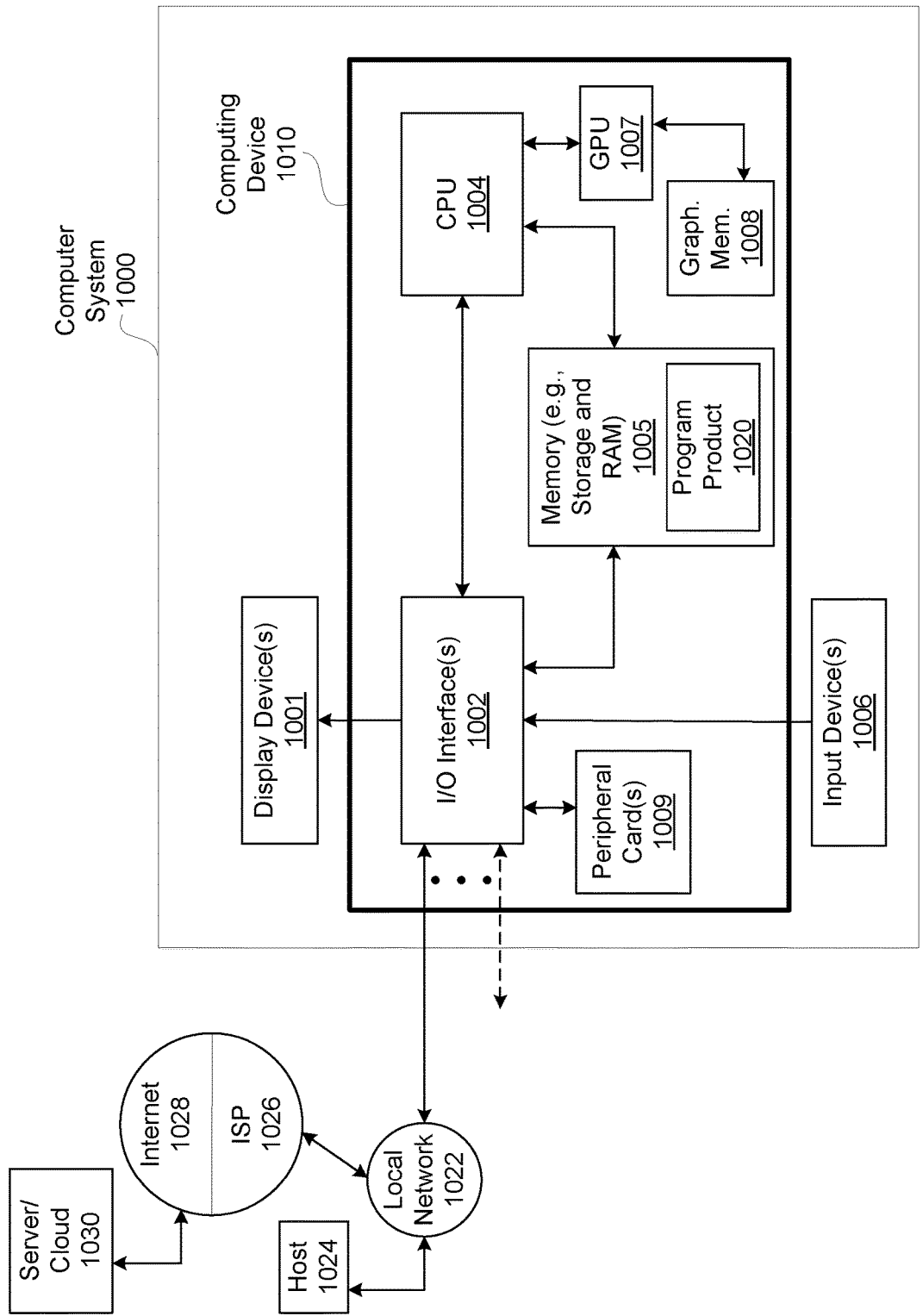
FIG. 10 is a block diagram depicting an exemplary computer system.

FIG. 10 is a block diagram depicting an exemplary computer system 1000 upon which one or more aspects described herein may be implemented. Computer system 1000 may include a programmed computing device 1010 coupled to one or more display devices 1001, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 1006, such as a keyboard and a cursor pointing device. Display device 1001 may be a display device configured for processing video data, as previously described. Other known configurations of a computer system may be used. Computer system 1000 by itself or networked with one or more other computer systems 1000 may provide an information handling system.

Programmed computing device 1010 may be programmed with a suitable operating system, which may include Mac OS, Java Virtual Machine, Real-Time OS Linux, Solaris, iOS, Darwin, Android Linux-based OS, Linux, OS-X, Unix, or a Windows operating system, among other platforms, including without limitation an embedded operating system, such as VxWorks. Programmed computing device 1010 includes a central processing unit ("CPU") 1004, one or more memories and/or storage devices ("memory") 1005, and one or more input/output ("I/O") interfaces ("I/O interface") 1002. Programmed computing device 1010 may optionally include a graphics processing unit ("GPU") 1007 coupled to CPU 1004 and one or more peripheral cards 1009 coupled to I/O interface 1002. Along those lines, programmed computing device 1010 may include graphics memory 1008 coupled to optional GPU 1007.

CPU 1004 may be a type of microprocessor known in the art, such as available from IBM, Intel, ARM, and Advanced Micro Devices for example. CPU 1004 may include one or more processing cores. Support circuits (not shown) may include busses, cache, power supplies, clock circuits, data registers, and the like.

Memory 1005 may be directly coupled to CPU 1004 or coupled through I/O interface 1002. At least a portion of an operating system may be disposed in memory 1005. Memory 1005 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 1005 may include an SSD, which is coupled to I/O interface 1002, such as through an SATA bus or other bus. Moreover, one or more SSDs may be used, such as for RAID or other multiple drive storage for example.

I/O interface 1002 may include chip set chips, graphics processors, and/or daughter cards, among other known circuits. In this example, I/O interface 1002 may be a Platform Controller Hub ("PCH"). I/O interface 1002 may be coupled to a conventional keyboard, network, mouse, camera, microphone, display printer, and interface circuitry adapted to receive and transmit data, such as data files and the like.

Programmed computing device 1010 may optionally include one or more peripheral cards 1009. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 1004 and I/O interface 1002. Along those lines, GPU 1007 may be incorporated into CPU 1004 and/or may be of a separate peripheral card.

Programmed computing device 1010 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 1010. However, for purposes of clarity and not limitation, it shall be assumed that an SSD is housed in programmed computing device 1010.

Memory 1005 may store all or portions of one or more programs or data, including variables or intermediate information during execution of instructions by CPU 1004, to implement processes in accordance with one or more examples hereof to provide program product 1020, including software stack 300 of FIG. 3. Program product 1020 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 1010 for implementing techniques described herein may be performed by computing device 1010 in response to CPU 1004 executing one or more sequences of one or more instructions contained in main memory of memory 1005. Such instructions may be read into such main memory from another machine-readable medium, such as a storage device of memory 1005. Execution of the sequences of instructions contained in main memory may cause CPU 1004 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 1020, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 1020. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 1000, tangible machine-readable media are involved, for example, in providing instructions to CPU 1004 for execution as part of programmed product 1020. Thus, a programmed computing device 1010 may include programmed product 1020 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 1004 for execution. For example, instructions may initially be carried on a magnetic disk or other storage media of a remote computer. The remote computer can load the instructions into its dynamic memory and send such instructions over a transmission media using a modem. A modem local to computer system 1000 can receive such instructions on such transmission media and use an infra-red transmitter to convert such instructions to an infra-red signal. An infra-red detector can receive such instructions carried in such infra-red signal and appropriate circuitry can place such instructions on a bus of computing device 1010 for writing into main memory, from which CPU 1004 can retrieve and execute such instructions. Instructions received by main memory may optionally be stored on a storage device either before or after execution by CPU 1004.

Computer system 1000 may include a communication interface as part of I/O interface 1002 coupled to a bus of computing device 1010. Such a communication interface may provide a two-way data communication coupling to a network link connected to a local network 1022. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 1022 may provide data communication through one or more networks to other data devices. For example, a network link may provide a connection through local network 1022 to a host computer 1024 or to data equipment operated by an Internet Service Provider ("ISP") 1026 or other Internet service provider. ISP 1026 may in turn provide data communication services through a world-wide packet data communication network, the "Internet" 1028. Local network 1022 and the Internet 1028 may both use electrical, electromagnetic or optical signals that carry analog and/or digital data streams. Data carrying signals through various networks, which carry data to and from computer system 1000, are exemplary forms of carrier waves for transporting information.

Wireless circuitry of I/O interface 1002 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000, EV-DO, and LTE/LTE-Advanced) can be used depending on the type of communication or the range of the communication.

Computer system 1000 can send messages and receive data, including program code, through network(s) via a network link and communication interface of I/O interface 1002. In the Internet example, a server 1030 might transmit a requested code for an application program through Internet 1028, ISP 1026, local network 1022 and I/O interface 1002. Received code may be executed by processor 1004 as it is received, and/or stored in a storage device, or other non-volatile storage, of memory 1005 for later execution. In this manner, computer system 1000 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for synchronizing access to buffered data, comprising:
   receiving, by a synchronizer, a write level indicator from a producer device, wherein the write level indicator comprises a write address;
   receiving, by the synchronizer, a read level indicator from a consumer device, wherein the read level indicator comprises a read address;
   comparing, by the synchronizer, the write level indicator with the read level indicator to determine a difference;
   informing, by the synchronizer, the consumer device when the difference meets a sub-frame threshold; and
   initiating, by the synchronizer, an instruction for the consumer device to read data from a frame buffer memory on a sub-frame-by-sub-frame basis responsive to the informing, wherein the data from the frame buffer memory comprises video data buffered in the frame buffer memory by the producer device.

2. The method according to claim 1, wherein:
   the sub-frame is a tile of a plurality of tiles defining a frame of the video data; and
   the tile has at least x rows and at least y columns for x and y positive integers greater than 1.

3. The method according to claim 1, wherein the synchronizer includes a finite state machine configured to update an address status register thereof to increment the read level indicator at least for each one entire row of a plurality of rows of a frame of the video data for streaming by the consumer device.

4. The method according to claim 1, wherein the producer device includes a digital video receiver interface configured for direct memory access to the frame buffer memory.

5. The method according to claim 1, wherein the consumer device includes a video encoder and a digital video transmitter interface.

6. The method according to claim 1, wherein the receiving of the write level indicator comprises:
updating, by the synchronizer, an end of data address in a producer status register responsive to continuation of the buffering, wherein the producer status register indicates status of the write level indicator for the buffered data, wherein the producer device writes the end of data address to the producer status register.

7. The method according to claim 6, wherein the receiving of the read level indicator comprises:
incrementing, by the synchronizer, an end of tile address in a consumer status register for a next sub-frame for tiling a frame of the video data; wherein the consumer status register indicates status of the read level indicator, wherein the consumer device writes the end of tile address to the consumer status register.

8. The method according to claim 1, wherein the receiving of the read level indicator comprises:
incrementing, by the synchronizer, an end of tile address in a consumer status register for a next sub-frame for tiling a frame of the video data, wherein the consumer status register indicates status of the read level indicator and the consumer device writes the end of tile address to the consumer status register.

9. The method according to claim 1, wherein the buffering comprises direct memory access writing by the producer device to the frame buffer memory.

10. The method according to claim 1, further comprising encoding by the consumer device the buffered data read.

11. A system for synchronizing access to share a frame buffer memory, comprising:
a synchronizer;
a producer device configured to buffer video data in the frame buffer memory and to provide a write level indicator to the synchronizer, wherein the write level indicator comprises a write address;
a consumer device configured to provide a read level indicator to the synchronizer, wherein the read level indicator comprises a read address;
the synchronizer configured to:
compare the write level indicator with the read level indicator to determine a difference,
inform the consumer device as to the difference meeting a sub-frame threshold, and
initiate an instruction for the consumer device to read data from the frame buffer memory on a sub-frame-by-sub-frame basis responsive to informing the consumer device as to the difference; and
the consumer device further configured to read the buffered data from the frame buffer memory on the sub-frame-by-sub-frame basis responsive to the informing as to the difference.

12. The system according to claim 11, wherein:
the sub-frame is a tile of a plurality of tiles defining a frame of the video data; and
the tile has at least x rows and at least y columns for x and y positive integers greater than 1.

13. The system according to claim 11, wherein the synchronizer includes a finite state machine configured to update an address status register thereof to increment the read level indicator at least for each one entire row of a plurality of rows of a frame of the video data for streaming by the consumer device.

14. The system according to claim 11, wherein the producer device is configured to write an end of data address to a producer status register of the synchronizer to indicate status of the write level indicator for the buffered data.

15. The system according to claim 14, wherein the consumer device is configured to write an end of tile address to a consumer status register of the synchronizer to indicate status of the read level indicator.

16. The system according to claim 15, wherein the consumer device is configured to increment the end of tile address in the consumer status register for a next sub-frame for tiling a frame of the video data.

17. The system according to claim 16, wherein:
the producer device includes a video encoder; and
the consumer device includes a video processing or display device.

18. The system according to claim 16, wherein:
the producer device includes a write/capture direct memory access circuit; and
the consumer device includes a video encoder.

19. The system according to claim 18, wherein the write/capture direct memory access circuit includes a digital video receiver interface configured for direct memory access to the frame buffer memory.

20. The system according to claim 16, wherein the synchronizer comprises programmed field programmable circuit resources of an integrated circuit.

* * * * *